(12) United States Patent
O'Donnell et al.

(10) Patent No.: US 11,913,488 B2
(45) Date of Patent: Feb. 27, 2024

(54) SELF-CLINCHING AND SELF-PIERCING CONSTRUCTION ELEMENT WITH MULTI-PURPOSE PILOT

(71) Applicant: RB&W MANUFACTURING LLC, Streetsboro, OH (US)

(72) Inventors: Marc Andrew O'Donnell, Burlington (CA); Michael Dacosta, Orangeville (CA)

(73) Assignee: RB&W MANUFACTURING LLC, Streetsboro, OH (US)

( * ) Notice: Subject to any disclaimer, the term of this patent is extended or adjusted under 35 U.S.C. 154(b) by 356 days.

(21) Appl. No.: 17/332,486

(22) Filed: May 27, 2021

(65) Prior Publication Data

US 2022/0381286 A1 Dec. 1, 2022

(51) Int. Cl.
*F16B 39/282* (2006.01)

(52) U.S. Cl.
CPC .................... *F16B 39/282* (2013.01)

(58) Field of Classification Search
CPC ...... F16B 37/04; F16B 37/041; F16B 37/043; F16B 37/045; F16B 37/046; F16B 37/068; F16B 39/28; F16B 39/282; Y10S 411/97
USPC ......... 411/172, 173–176, 179, 183, 187–188
See application file for complete search history.

(56) References Cited

U.S. PATENT DOCUMENTS

| | | |
|---|---|---|
| 2,096,335 A | 10/1937 | Nicholas |
| 3,053,300 A | 9/1962 | Quinto |
| 3,640,326 A | 2/1972 | Brown |
| 3,811,171 A | 5/1974 | Grube |
| 3,878,599 A | 4/1975 | Ladouceur et al. |
| 4,690,599 A | 9/1987 | Shinjo |
| 5,067,224 A | 11/1991 | Muller |
| 5,340,251 A | 8/1994 | Takahashi et al. |
| 5,549,430 A | 8/1996 | Takahashi et al. |

(Continued)

FOREIGN PATENT DOCUMENTS

| | | |
|---|---|---|
| CN | 101280352 A | 10/2008 |
| CN | 103233960 A | 8/2013 |

(Continued)

OTHER PUBLICATIONS

International Search Report for corresponding International Application No. PCT/US2021/034548 dated Feb. 18, 2022, 2 pages.

(Continued)

*Primary Examiner* — Roberta S Delisle
(74) *Attorney, Agent, or Firm* — Pearne & Gordon LLP (57) ABSTRACT

A self-clinching and self-piercing construction element for attachment to a plastically deformable metal panel. The construction element includes a body portion with a central axis and a punch portion being coaxial with the central axis and extending from the body portion. A pilot embossment is coaxial with the central axis and extends from the body portion such that the pilot embossment is concentrically disposed between an annular-shaped surface of the body portion and the punch portion. The pilot embossment being configured to engage and plastically deform the metal substrate such that the metal substrate flows into a recessed pocket defined in an outer peripheral surface of the punch portion. A plurality of spaced apart lugs axially project outwards from the annular-shaped surface and extend radially outwards from the pilot embossment.

21 Claims, 5 Drawing Sheets

(56) References Cited

U.S. PATENT DOCUMENTS

| | | | |
|---|---|---|---|
| 5,743,691 A | 4/1998 | Donovan | |
| 6,021,562 A | 2/2000 | Boster et al. | |
| D437,211 S | 2/2001 | Pamer et al. | |
| D440,865 S | 4/2001 | Pamer et al. | |
| 6,220,804 B1 | 4/2001 | Pamer et al. | |
| D448,659 S | 10/2001 | Pamer et al. | |
| D448,660 S | 10/2001 | Pamer et al. | |
| D454,057 S | 3/2002 | Pamer et al. | |
| D454,484 S | 3/2002 | Pamer et al. | |
| D457,054 S | 5/2002 | Pamer et al. | |
| 6,409,444 B2 | 6/2002 | Pamer et al. | |
| 6,712,370 B2 | 3/2004 | Kawada et al. | |
| 7,001,125 B2 * | 2/2006 | Wojciechowski | F16B 37/065 411/181 |
| 7,112,024 B2 * | 9/2006 | Ward | F01N 3/027 411/188 |
| 7,112,025 B2 * | 9/2006 | Ward | B23P 19/062 411/188 |
| 7,383,624 B2 | 6/2008 | Wojciechowski et al. | |
| 7,591,623 B2 * | 9/2009 | Parker | F16B 37/068 411/188 |
| D613,596 S | 4/2010 | Mangapora | |
| 7,740,436 B2 | 6/2010 | Pamer | |
| 7,815,406 B2 * | 10/2010 | Babej | B23P 19/062 411/181 |
| 8,062,141 B2 | 11/2011 | Pamer | |
| 8,186,920 B2 * | 5/2012 | Shuart | F16B 37/068 411/181 |
| 8,261,591 B2 | 9/2012 | Hielscher | |
| 8,328,485 B2 | 12/2012 | Babej et al. | |
| 8,608,420 B2 * | 12/2013 | Kovac | F16B 27/00 411/180 |
| 8,888,429 B2 | 11/2014 | Pamer et al. | |
| 8,931,160 B2 | 1/2015 | Shinjo | |
| 8,979,455 B2 | 3/2015 | Burton | |
| 9,132,464 B2 | 9/2015 | Takacs et al. | |
| 9,322,424 B2 | 4/2016 | Pamer et al. | |
| 9,322,426 B2 | 4/2016 | Thomas | |
| 9,574,602 B2 | 2/2017 | Burton | |
| 9,849,549 B2 | 12/2017 | Diehl et al. | |
| 2001/0010789 A1 | 8/2001 | Pamer et al. | |
| 2005/0076492 A1 | 4/2005 | Goodsmith et al. | |
| 2005/0147481 A1 | 7/2005 | Wojciechowski et al. | |
| 2005/0163590 A1 * | 7/2005 | Ward | F01N 13/009 411/179 |
| 2006/0099047 A1 | 5/2006 | Bentrim | |
| 2006/0204348 A1 * | 9/2006 | Shuart | F16B 37/068 411/107 |
| 2006/0251489 A1 | 11/2006 | Denham et al. | |
| 2007/0258788 A1 * | 11/2007 | Gardstam | B23P 19/062 411/176 |
| 2008/0107499 A1 | 5/2008 | Denham et al. | |
| 2008/0148544 A1 * | 6/2008 | Shuart | F16B 19/02 29/525.01 |
| 2009/0056403 A1 | 3/2009 | Chanko | |
| 2010/0209210 A1 * | 8/2010 | Kovac | F16B 37/062 411/172 |
| 2010/0209211 A1 * | 8/2010 | Babej | B23P 19/062 411/173 |
| 2012/0142440 A1 | 6/2012 | Babej et al. | |
| 2012/0219377 A1 | 8/2012 | Pamer et al. | |
| 2013/0149067 A1 | 6/2013 | Shinjo | |
| 2013/0185917 A1 | 7/2013 | Diehl et al. | |
| 2013/0185921 A1 | 7/2013 | Diehl et al. | |
| 2013/0302107 A1 | 11/2013 | Burton | |
| 2013/0327453 A1 | 12/2013 | Takacs et al. | |
| 2014/0338802 A1 | 11/2014 | Okita et al. | |
| 2014/0348609 A1 * | 11/2014 | Chen | F16B 39/282 411/209 |
| 2015/0023762 A1 | 1/2015 | Pamer et al. | |
| 2015/0322994 A1 | 11/2015 | Mangapora | |
| 2016/0221069 A1 | 8/2016 | Diehl et al. | |
| 2016/0298204 A1 | 10/2016 | Thomas | |
| 2020/0217350 A1 | 7/2020 | Donovan | |
| 2021/0018032 A1 | 1/2021 | O'Donnell | |

FOREIGN PATENT DOCUMENTS

| | | |
|---|---|---|
| DE | 102012012518 A1 | 12/2013 |
| DE | 10213218605 A1 | 3/2015 |
| EP | 2618009 B1 | 6/2016 |
| EP | 2618010 B1 | 6/2016 |
| GB | 2401661 B | 11/2004 |
| JP | 2002-257123 A | 9/2002 |
| JP | 2005515379 A | 5/2005 |
| KR | 1020140073388 A | 6/2014 |
| WO | 02/070907 A1 | 9/2002 |

OTHER PUBLICATIONS

Written Opinion for corresponding International Application No. PCT/US2021/034548 dated Feb. 18, 2022, 5 pages.
International Search Report completed Apr. 14, 2020 in related application PCT/US2019/041797, 3 pages.
Written Opinion completed Apr. 14, 2020 in related Application No. PCT/US2019/041797, 7 pages.

* cited by examiner

SELF-CLINCHING AND SELF-PIERCING CONSTRUCTION ELEMENT WITH MULTI-PURPOSE PILOT

FIELD OF THE INVENTION

This application relates generally to self-attaching construction elements, and more particularly, clinch nuts, studs, and non-threaded construction elements (e.g., spacers).

BACKGROUND OF THE INVENTION

Self-attaching construction elements are used in many industries such as, for example, the automotive and appliance industries to secure various components to a metal substrate. During installation, the construction elements must have sufficient rotational resistance to keep them from rotating relative to the metal substrate. Further, during service, the construction elements must have sufficient push-out resistance to keep them from separating from the metal substrate when external forces such as, for example, vibration or other tensile forces are applied.

Installing (i.e., attaching) traditional construction elements to conventional metal substrates (e.g., flat, relatively thin metal panels) is generally accomplished by forcing the construction element into the metal substrate (i.e., sandwiching the construction element and the metal substrate between a drive mechanism and an anchoring block) such that material of the metal substrate plastically deforms and conforms to select features and profiles of the construction element.

The conventional construction elements and traditional installation techniques are sufficient to yield satisfactory rotational and push-out resistances when the construction element is attached to typical metal substrates, such as relatively thin metal panels. However, with respect to more complex metal substrates (i.e., having difficult geometries), such as hollow-metal tubes, conventional construction elements and/or their associated installation techniques either yield unsatisfactory resistances or structurally deform the metal substrate such that it is unusable for its intended purpose.

Accordingly, there is a need in the art for an improved construction element (i.e., that is self-clinching and/or self-piercing) which can be reliably and consistently attached to non-conventional metal substrates having complex geometries, wherein the attachment of the construction element to the non-conventional metal substrate yields sufficient push-out strength, sufficient rotational resistance, and without impairing the structural integrity of said metal substrate.

BRIEF SUMMARY OF THE INVENTION

In accordance with one aspect, there is provided a self-clinching construction element for attachment to a plastically deformable metal substrate. The self-clinching construction element includes a body portion with a central axis. The body portion has an outer peripheral surface extending in a direction of the central axis, and an annular-shaped surface extending in a direction perpendicular to the central axis. A punch portion is coaxial with the central axis and extends from the body portion. The punch portion includes an outer peripheral surface extending in the direction of the central axis. A pilot embossment is coaxial with the central axis and extends from the body portion such that the pilot embossment is concentrically disposed between the annular-shaped surface and the punch portion. The pilot embossment is configured to engage and plastically deform the metal substrate such that the metal substrate flows into a recessed pocket defined in the outer peripheral surface of the punch portion. A plurality of spaced lugs axially project outwards from the annular-shaped surface and extend radially outwards from the pilot embossment. The plurality of spaced apart lugs collectively encircle the pilot embossment.

In accordance with another aspect, there is provided a self-clinching construction element for attachment to a plastically deformable metal substrate. The self-clinching construction element includes a body portion with a central axis. The body portion has an outer peripheral surface extending in a direction of the central axis, and an annular-shaped surface extending in a direction perpendicular to the central axis. A punch portion is coaxial with the central axis and extends from the body portion. The punch portion includes an outer peripheral surface extending in the direction of the central axis. A pilot embossment is coaxial with the central axis and extends from the body portion such that the pilot embossment is concentrically disposed between the annular-shaped surface and the punch portion. A lug axially projects outwards from the annular-shaped surface and extends radially outwards from the pilot embossment. During installation of the self-clinching construction element to the metal substrate, the pilot embossment and the lug are dimensionally configured such that the metal substrate engages with the pilot embossment prior to engaging the lug.

In accordance with yet another aspect, there is provided a self-clinching construction element for attachment to a plastically deformable metal substrate. The self-clinching construction element includes a body portion with a central axis. The body portion has an outer peripheral surface extending in a direction of the central axis, and an annular-shaped surface extending in a direction perpendicular to the central axis. A punch portion is coaxial with the central axis and extends from the body portion. The punch portion includes an outer peripheral surface extending in the direction of the central axis. Further, the punch portion includes first and second perimeter surfaces, and an intermediate surface disposed therebetween. The intermediate surface gradually and continuously inclines from the first perimeter surface to the second perimeter surface in the direction perpendicular to the central axis. The second perimeter surface is radially offset from the first perimeter surface to define a recessed pocket in the punch portion.

The self-clinching construction element further includes a pilot embossment that is coaxial with the central axis and that extends from the body portion such that the pilot embossment is concentrically disposed between the annular-shaped surface and the punch portion. The pilot embossment continuously extends about the punch portion in an uninterrupted manner, and includes a perimetric surface and an engagement surface. The perimetric surface extends in the direction of the central axis, and the engagement surface is annular in shape and extends in the direction perpendicular to the central axis. The engagement surface is configured to engage and plastically deform the metal substrate such that the metal substrate flows into the recessed pocket. A plurality of spaced apart lugs axially project outwards from the annular-shaped surface and extend radially outwards from the perimetric surface of the pilot embossment. The plurality of spaced apart lugs collectively encircle the pilot embossment. One of the lugs has a contact face configured to engage the metal substrate, and the contact face is concave shaped. During installation of the self-clinching construction element to the metal substrate, the pilot embossment and said one of the lugs are dimensionally configured such that the metal substrate engages with the engagement surface of the pilot embossment prior to engaging the contact face.

DESCRIPTION OF EXAMPLE EMBODIMENTS

Figure 1:
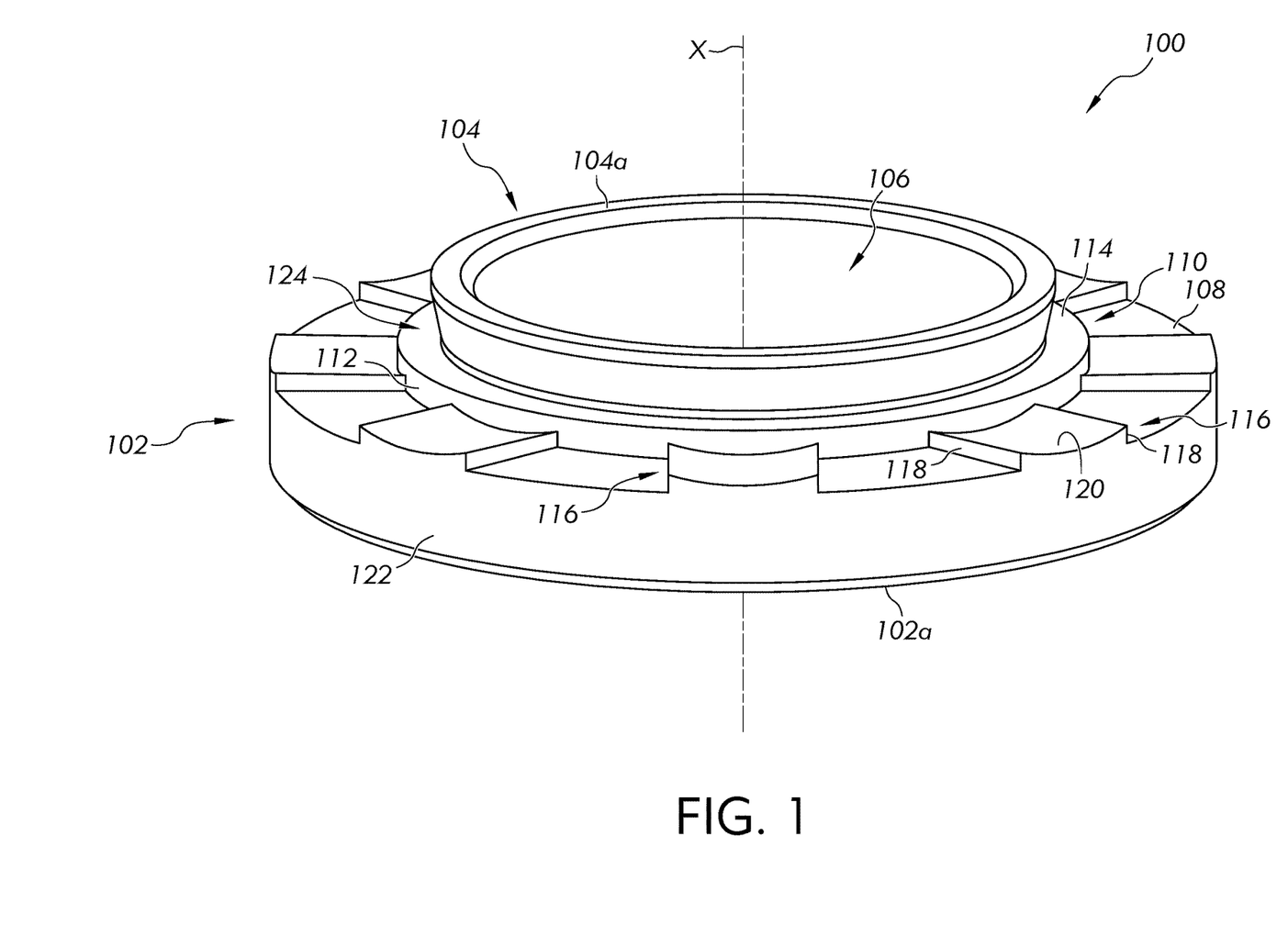
FIG. 1 is a perspective view of a self-clinching and self-piercing construction element.

It is to be appreciated that the following description includes many features which can be utilized in various combinations that may include all or less than all of the features. All such combinations of features are intended to come within the scope of this application. Referring now to the drawings, FIG. 1 depicts a construction element 100, which includes fasteners, for attachment to a plastically deformable metal substrate (e.g., a plate, a panel, a hollow cylinder, etc.). Specifically, the construction element 100 described herein is attachable to both conventional metal substrates (e.g., flat, relatively thin metal panels) and non-conventional metal substrates (e.g., hollow-metal tubes), and provides sufficient rotational and push-out resistances. The construction element 100 may be a self-clinching construction element that, during installation to the metal substrate, clinches and attaches to a pre-made hole formed in the metal substrate having a thickness of 1 mm or greater. Optionally, the construction element 100 is a self-piercing and self-clinching construction element that, during installation, both pierces an aperture in the metal substrate and clinches itself thereto. While the illustrated embodiment depicts the construction element 100 as a spacer, sleeve, etc. (i.e., a non-threaded construction element), other self-clinching construction elements such as, for example, self-piercing and/or self-clinching studs (depicted in FIG. 6, and briefly discussed below) and self-piercing and/or self-clinching nuts are within the scope of the present invention. For brevity, a majority of the below-description will be made with respect to an embodiment depicting the construction element 100 as a self-clinching spacer (i.e., a non-threaded construction element), with the understanding that this disclosure likewise applies to self-piercing and/or self-clinching studs and/or nuts, as well as any other types of construction elements.

Figure 3:
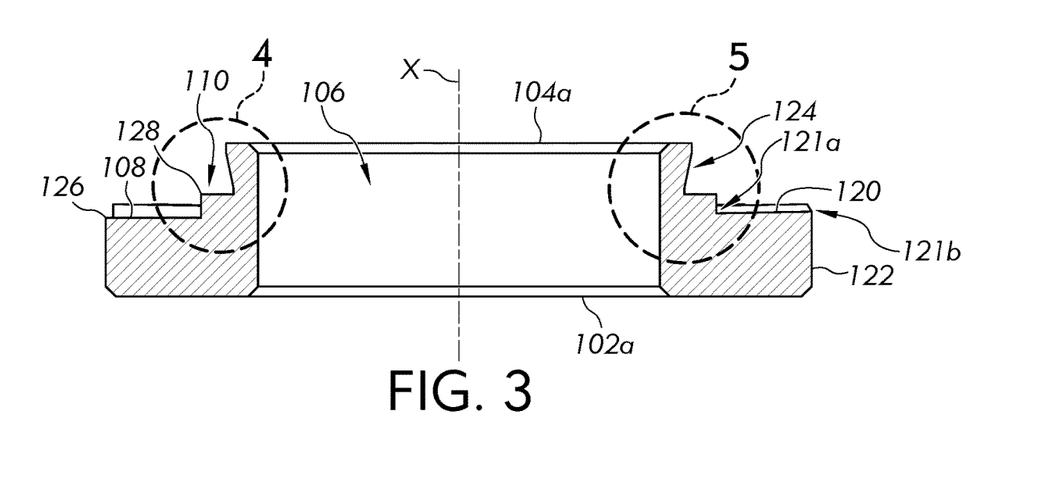
FIG. 3 is a sectional view of the construction element taken along the line 3-3 in FIG. 2.
Figure 6:
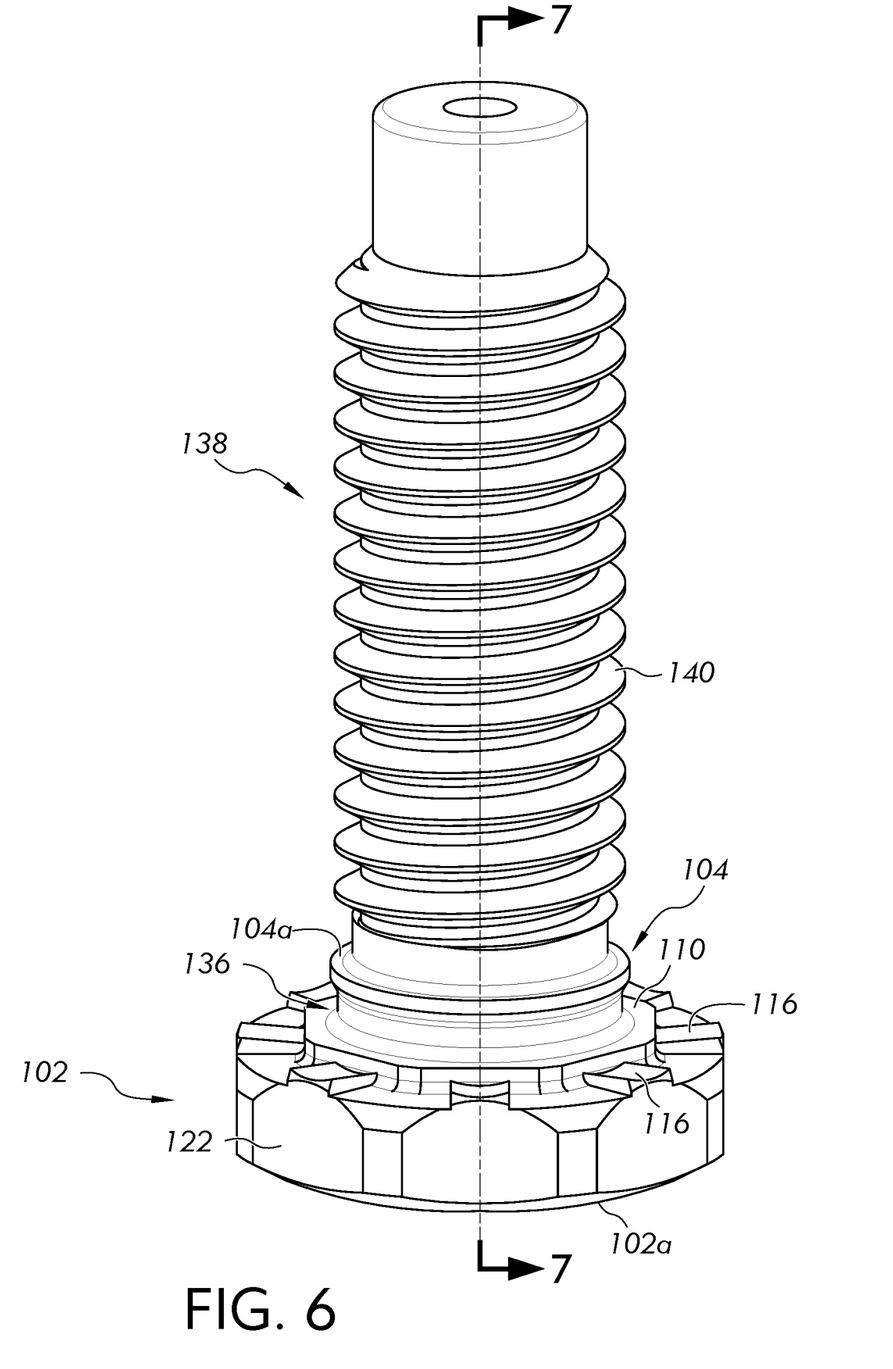
FIG. 6 is a perspective view of a stud including a clinch mounting portion as shown in FIG. 1.

The construction element 100 has a body portion 102 and a multi-purpose pilot or punch portion 104 extending from one end of the body portion 102. A through-hole or bore 106 axially extends through both the body portion 102 and the punch portion 104. While the bore 106 is shown as being a simple through-hole (i.e., having a smooth, uninterrupted circumferential wall), it is contemplated that the bore 106 can be threaded (to yield a self-clinching nut) such that a mating, threaded fastener (e.g., bolt, screw, etc.) can be inserted in the threaded bore for attachment thereto. In another example, where the construction element 100 is a self-piercing and self-clinching stud such as shown in FIG. 6, the punch portion 104 can be solid and contain no through-hole; instead, a threaded or non-threaded stud can extend outwards from the opposite side of the body portion 102, as described below.

In yet another example where the construction element 100 is a self-clinching spacer, upon installation of the construction element 100 to a plastically deformable metal substrate, a fastener (e.g., a bolt, threaded screw, etc.) can be inserted into the bore 106 such that a spaced distance is provided between either a head of the fastener and the metal substrate, or a corresponding nut (configured to be attached to the bolt, screw, etc.) and the metal substrate. That is, the construction element 100 provides a predetermined space between two distinct objects (i.e., the metal substrate and a separate fastener).

Figure 2:
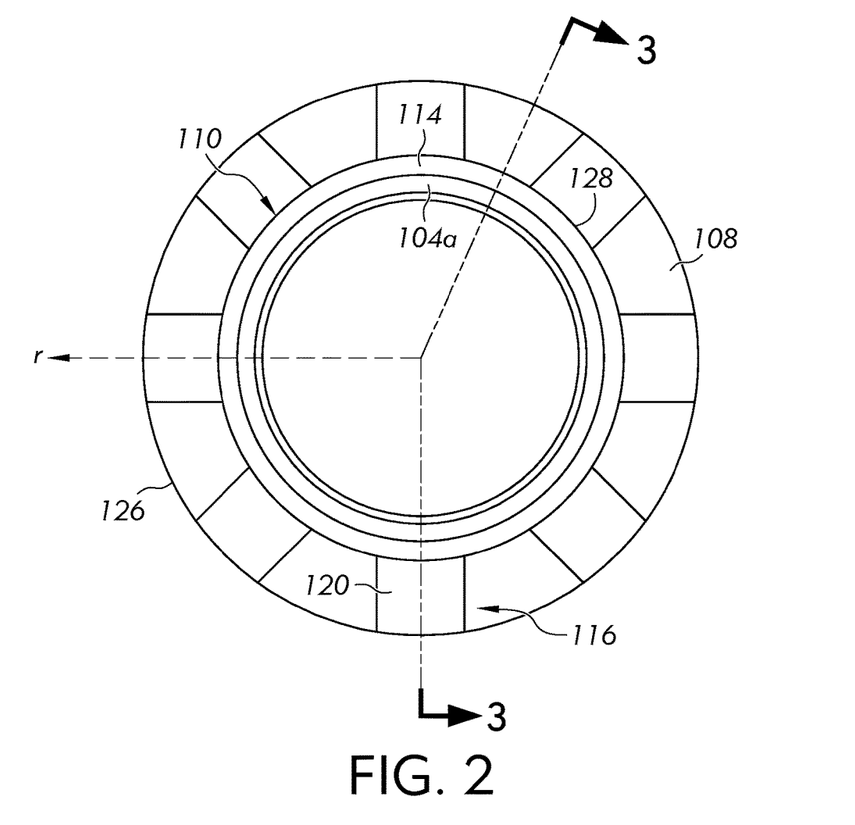
FIG. 2 is a top view of the construction element depicted in FIG. 1.

As further shown, the body portion 102 and the punch portion 104 are coaxial with a central axis 'X.' With reference to FIGS. 1-3, the body portion 102 extends to a bottom or first end surface 102a of the construction element 100, corresponding to one axial extremity of the constructional element 100. The first end surface 102a of the construction element 100 is shown as being substantially perpendicular to the central axis "X," and having a chamfer at a radially, outer periphery thereof. However, the first end surface 102a may have other geometric configurations; for example, the first end surface 102a may be inclined or declined with respect to the central axis "X." Said differently, the first end surface 102a may gradually converge radially inwards or diverge radially outwards with respect to an installation direction of the construction element 100. As is further shown, the punch portion 104 extends to a top or second end surface 104a of the construction element 100, corresponding to the other axial extremity of the construction element 100. The second end surface 104a of the construction element 100 is likewise depicted as being substantially perpendicular to the central axis "X," however, the second end surface 104a could alternatively be angled, as described above with respect to the first end surface 102a.

The punch portion 104 is radially smaller than the body portion 102 such that the body portion 102 includes a generally annular-shaped surface 108 encircling the punch portion 104. That is, the punch portion 104 extends from the body portion 102 in a direction of the central axis 'X,' and is positioned such that the annular-shaped surface 108 encircles the punch portion 104. The annular-shaped surface 108 extends in a direction perpendicular to the central axis (i.e., extending in a radial direction 'r' of the construction element 100, see FIG. 2) and is configured to engage the metal substrate to which the construction element 100 is to be attached to.

As further shown, the construction element 100 includes a pilot embossment 110 axially projecting outwards from the body portion 102 in a direction opposite to the first end surface 102a of the construction element 100. The pilot embossment 110 encircles the punch portion 104. More specifically, the pilot embossment 110 is positioned concentrically between the second end surface 104a of the construction element 100 and the annular-shaped surface 108 (in the radial direction 'r'). Accordingly, the pilot embossment 110 is radially larger than the punch portion 104 but radially smaller than the body portion 102. Further, the pilot embossment 110 is shown as being generally cylindrical in shape. However, it is contemplated that the pilot embossment 110 may have other geometric configurations, such as a polygonal shape (e.g., a hexagon, octagon, etc.). Moreover, the pilot embossment 110 is shown as continuously extending (circumferentially) about the punch portion in an uninterrupted manner. That is, there are no circumferential gaps formed in the pilot embossment 110. However, in other embodiments, the pilot embossment 110 may be broken up into multiple (discrete) sections and circumferentially spaced, one from the other, about the punch portion 104 such that the multiple sections of the pilot embossment 110 collectively encircle the punch portion 104.

As shown, the pilot embossment 110 includes a perimetric surface 112 and an engagement surface 114. The perimetric surface 112 of the pilot embossment 110 extends in the axial direction (i.e., parallel to the central axis 'X') and the engagement surface 114 is generally annular in shape and extends in the radial direction 'r,' as will be further discussed below.

The construction element 100 further includes a plurality of spaced apart lugs 116 that collectively encircle the pilot embossment 110. Each of the lugs 116 axially projects outward from the annular-shaped surface 108 in a direction opposite to the first end surface 102a of the construction element 100, and radially projects outward from the pilot embossment 110. More specifically, each of the lugs 116 includes a pair of upstanding side-walls 118 and a contact face 120 extending between said pair of side-walls 118, as will be further described below. In one embodiment, as shown, the plurality of lugs 116 are equally spaced apart, one from the other, and all have the same configuration. Alternatively, the plurality of lugs 116 can be unequally spaced apart about the pilot embossment 110, one from the other, and/or can have varying configurations.

With respect to FIGS. 1 and 3, the body portion 102 and punch portion 104 include outer peripheral surfaces 122, 124, respectively, that extend in the direction of the central axis 'X.' In one embodiment, the outer peripheral surface 122 of the body portion 102 is planar (in cross-section) and parallel with respect to the central axis 'X' to provide a cylindrical shape. Alternatively, the outer peripheral surface 122 of the body portion 102 may have a plurality of flat sides which can be readily used by hand or machine tools. For example, the outer peripheral surface 122 of the body portion 102 may be polygonal-shaped and the plurality of faces may all have the same dimensions (i.e., height and width) such that the outer peripheral surface 122 of the body portion 102 is formed by six or eight faces. Alternatively, a total of four to twelve faces may form the outer peripheral surface 122 of the body portion 102. Further still, the outer peripheral surface 122 of the body portion 102 may be curved (in cross-section) with a convex or concave shape and/or non-parallel with respect to the central axis 'X.' The height (i.e., the axial dimension) and width (i.e., the radial dimension) of the body portion 102 are selected to provide the desired spacing, as mentioned above. Where the construction element 100 has a self-clinching stud, the height and width of the body portion 102 can be likewise selected to provide sufficient strength for the stud and any intended mating fasteners.

Figure 4:
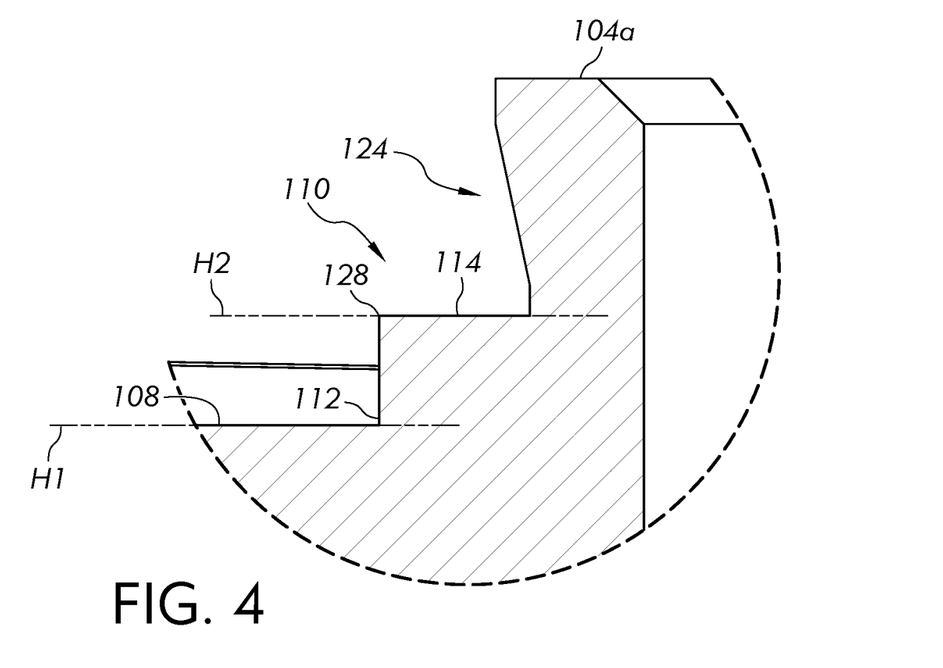
FIG. 4 is an enlarged view of detail area "4" depicted in FIG. 3.

As shown in FIG. 4, which is an enlarged detail view of an encircled area of the construction element 100 depicted in FIG. 3, the annular-shaped surface 108 of the body portion 102 lies on a first imaginary horizontal plane 'H1.' Moreover, the engagement surface 114 of the pilot embossment 110 lies on a second imaginary horizontal plane 'H2.' Notably, the first and second imaginary horizontal planes 'H1,' 'H2' are parallel with respect to one another and are both configured such that the central axis 'X' is normal thereto. In other words, the illustrated example shows the annular-shaped surface 108 of the body portion 102 and the engagement surface 114 of the pilot embossment 110 extending outwards in the same general direction (i.e., in the radial direction 'r') and being parallel with respect to one another.

As further shown, the annular-shaped surface 108 of the body portion 102 and the engagement surface 114 of the pilot embossment 110 are spaced apart from and connected to one another via the perimetric surface 112 of the pilot embossment 110. Briefly moving back to FIG. 3, an outer radius of the annular-shaped surface 108 meets with (i.e., intersects) the outer peripheral surface 122 of the body portion 102 at a first peripheral edge 126. In other words, the annular-shaped surface 108 is coterminous with the outer peripheral surface 122 of the body portion 102 at the first peripheral edge 126. Now with reference to FIG. 4, an inner radius of the annular-shaped surface 108 meets with (i.e., intersects) one end (i.e., a lower-most end) of the perimetric surface 112, and an outer radius of the engagement surface 114 meets with (i.e., intersects) the other end (i.e., an upper-most end) of the perimetric surface 112. That is, the perimetric surface 112 is coterminous with the engagement surface 114 at a second peripheral edge 128.

While the annular-shaped surface 108 and the engagement surface 114 are depicted as both lying on respective, imaginary horizontal planes, it is contemplated that the annular-shaped surface 108 and/or the engagement surface 114 may be angled with respect to their corresponding planes. For example, the annular-shaped surface 108 may incline or decline from its inner radius to the first peripheral edge 126 in the radial direction 'r.' Additionally, or alternatively, the engagement surface 114 may incline or decline from its inner radius to the second peripheral edge 128 in the radial direction 'r.' Accordingly, it is to be understood that the annular-shaped surface 108 and the engagement surface 114 need not be parallel with respect to one another. As shown, the annular-shaped surface 108 and the engagement surface 114 are spaced from and connected to one another via the perimetric surface 112. Thus, in the depicted embodiment, the perimetric surface 112 defines a distance (i.e., height) that the pilot embossment 110 axially extends (i.e., along the central axis 'X') from the body portion 102.

Figure 5:
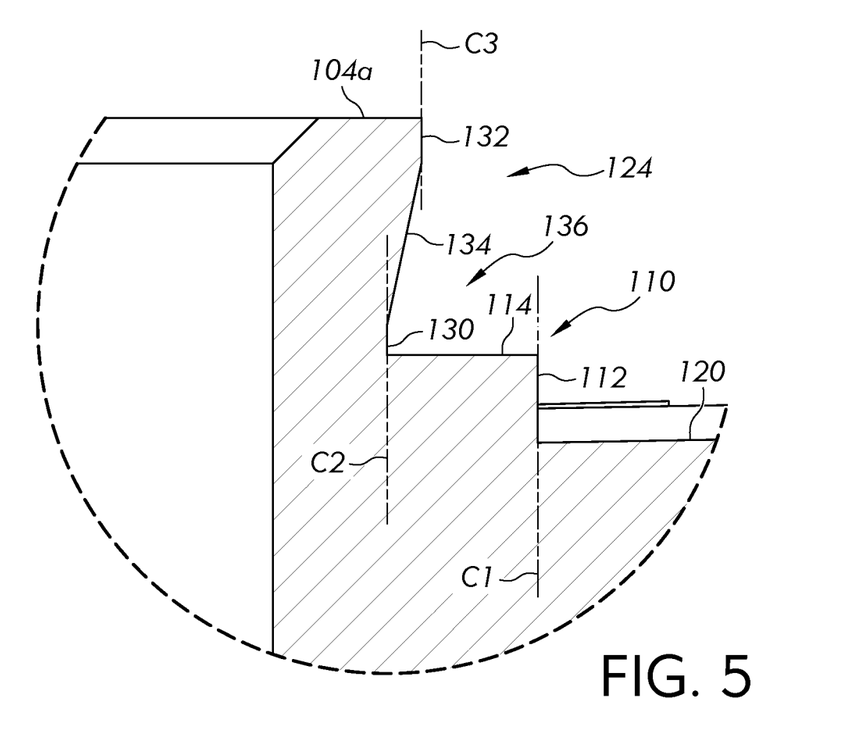
FIG. 5 is an enlarged view of detail area "5" depicted in FIG. 3.

Now with reference to FIG. 5, which is an enlarged detail view of an encircled area of the construction element 100 depicted in FIG. 3, the perimetric surface 112 of the pilot embossment 110 lies on a first imaginary circumferential plane 'C1.' Notably, the first imaginary circumferential plane 'C1' is coaxial and parallel with the central axis 'X.' Accordingly, the perimetric surface 112 is perpendicular to both the engagement surface 114 and the annular-shaped surface 108. However, it is contemplated that the perimetric surface 112 need not be perpendicular to the engagement surface 114 and/or the annular-shaped surface 108. For example, the perimetric surface 112 may be angled with respect to the central axis 'X' such that a radial distance between the perimetric surface 112 and the central axis 'X' gradually increases or decreases in a direction from the annular-shaped surface 108 to the engagement surface 114.

As further shown in FIG. 5, the outer peripheral surface 124 of the punch portion 104 has a generally angled configuration. Specifically, the outer peripheral surface 124 of the punch portion 104 comprises a first perimeter surface 130, a second perimeter surface 132, and an intermediate surface 134 disposed therebetween. The first and second perimeter surfaces 130, 132 are generally cylindrical in shape and lie on respective second and third imaginary circumferential planes 'C2,' 'C3.' The second and third imaginary circumferential planes 'C2,' 'C3' are both coaxial and parallel with the central axis 'X.' Accordingly, the first and second perimeter surfaces 130, 132 extend in the axial direction (i.e., along the central axis 'X') and are parallel with respect to one another. Moreover, the second and third imaginary circumferential planes 'C2,' 'C3' are concentrically arranged. Specifically, the second imaginary circumferential plane 'C2' has a smaller radial dimension than that of the third imaginary circumferential plane 'C3.' Accordingly, the first perimeter surface 130 is radially offset from the second perimeter surface 132. That is, the first perimeter surface 130 is disposed closer to the central axis 'X' in the radial direction 'r' than the second perimeter surface 132. Notably, the first and second perimeter surfaces 130, 132 are shown as being planar-shaped in cross-section (i.e., as shown in FIG. 5). However, it is contemplated that the first and/or second perimeter surfaces 130, 132 may have a different geometric configuration. For example, the first and/or second perimeter surfaces 130, 132 may be convex or concave-shaped, in cross-section.

As noted above, the intermediate surface 134 is disposed between the first and second perimeter surfaces. More specifically, the intermediate surface 134 gradually and continuously inclines from the first perimeter surface 130 to the second perimeter surface 132 in the radial direction 'r.' In other words, a radial dimension of the intermediate surface 134 at a location where the intermediate surface 134 meets with (i.e., intersects) the first perimeter surface 130 is smaller than a radial dimension of the intermediate surface 134 at a location where the intermediate surface 134 meets with (i.e., intersects) the second perimeter surface 132, and the radial dimension of the intermediate surface 134 continuously increases in a direction from the first perimeter surface 130 to the second perimeter surface 132 (along the central axis 'X'). Due to this configuration, a recessed pocket 136 is defined in the outer peripheral surface 124 of the punch portion 104, wherein the pocket 136 has a greater (radial) depth adjacent the pilot embossment 110. This recessed pocket 136 is configured to receive and retain deformed material of the metal substrate during installation of the construction element 100 thereto, as will be further described below.

Notably, it is to be understood that the recessed pocket 136 is not constrained to the specific configuration, described above. For example, the recessed pocket 136 can be a simple C-shaped groove formed in the outer peripheral surface 124 of the punch portion 104, and which circumferentially extends about the punch portion 104 in an uninterrupted manner. Alternatively, the C-shaped groove can be broken up into various discrete, circumferential sections, which together form the recessed pocket 136. Accordingly, it is to be understood that the recessed pocket 136 can take any geometric form.

In the depicted embodiment, the intermediate surface 134 of the outer peripheral surface 124 of the punch portion 104 is shown as being planar-shaped in cross-section (i.e., as shown in FIG. 5). However, it is contemplated that the intermediate surface 134 may have a different geometric configuration. For example, the intermediate surface 134 may have a concave shape or a convex shape in cross-section.

Now moving back to FIG. 1 and as briefly mentioned above, each of the lugs 116 axially projects outwards from the annular-shaped surface 108 of the body portion 102 and extends radially outwards from the pilot embossment 110. The geometric shape of a single lug 116 will now be discussed with the understanding that the below-disclosure likewise applies to the other lugs. The contact face 120 extends between the pair of side-walls 118 (i.e., in a circumferential direction of the construction element 100) and extends in the radial direction 'r.' Specifically, as depicted in FIG. 3, the contact face 120 has opposite, first and second (radial) end portions 121a, 121b. The first end portion 121a is disposed adjacent the perimetric surface 112 of the pilot embossment 110, and more particularly, is formed therewith such that the lug 116 directly extends (radially outwards) from the pilot embossment 110. The second end portion 121b extends to and is (axially) aligned with the first peripheral edge 126. That is, the second end portion 121b and the outer peripheral surface 122 of the body portion 102 reside on a common, imaginary circumferential plane (not shown).

As best shown in FIG. 1, the contact face 120 has a concave shape. More specifically, the curved nature of the contact face 120 is generally parabolic (in cross-section), such that its lowest point resides at the center of the curve. In another embodiment, the contact face 120 need not be concave shaped. For example, the contact face 120 can be planar in shape, convex shaped, or even have multiple surfaces with varying geometries. Notably, regarding the depicted embodiment, even the lowest point of the contact face 120 is distanced from the annular-shaped surface 108. That is, an entirety of the contact face 120 is axially spaced from the first imaginary horizontal plane 'H1' in a direction from the first end surface 102a towards the second end surface 104a.

Further, a distance between the contact face 120 and the annular-shaped surface 108 (in the axial direction) is greatest at respective junctions between the contact face 120 and the pair of side-walls 118. That is, the side-walls 118 of the lug 116 define a greatest distance (i.e., height) in the axial direction of the lug 116 with respect to the first imaginary horizontal plane 'H1' on which the annular-shaped surface 108 lies.

As further depicted, the greatest height of the lug 116 (with respect to the annular-shaped surface 108) is less than the height of the pilot embossment 110 (which is defined by the axial dimension of the perimetric surface 112). This dimensional difference ensures that the pilot embossment 110 engages with the metal substrate prior to the lugs 116 engaging the metal substrate, as will be further discussed below. Notably, while the second end portion 121b of the contact face 120 is shown as being distanced from the first peripheral edge 126 (i.e., distanced from the first imaginary horizontal plane 'H1'), it is contemplated that the contact face 120 can be radially sloped such that at least a portion of the first end portion 121a (e.g., its lowest point) is coterminous with the first peripheral edge 126. That is, the contact face 120 of the lug 116 can be radially sloped, in a declining manner, in a direction radially outwards from the pilot embossment 110. In other embodiments, the contact face 120 of the lug 116 can be radially sloped, in an inclining manner, in a direction radially outwards from the pilot embossment 110.

Further still, it is contemplated that the lug 116 need not extend directly from (i.e., physically contact) the pilot embossment 110. For example, the lug 116 can be radially spaced from the perimetric surface 112 of the pilot embossment 110 such that a gapped distance is defined therebetween. In yet another embodiment, the lug 116 need not radially extend to the imaginary circumferential plane (not shown) on which the outer peripheral surface 122 of the body portion 102 lies. Rather, the lug 116 can extend to a location that is radially spaced (inwards) from said imaginary circumferential plane (not shown).

All the components of the above-discussed construction element 100, specifically the body portion 102, the punch portion 104, the pilot embossment 110, and the lug(s) 116 are formed integrally with respect to one another. That is, the body portion, 102, the punch portion 104, the pilot embossment 110, and the lug(s) 116 are all formed from the same stock material. For example, the construction element 100 can be manufactured from carbon steel, stainless steel, aluminum, brass, or other metals. Furthermore, it is preferable for the material of the construction element 100 to have a hardness greater than that of the metal substrate to which it is to be attached to. Where the construction element is a self-clinching stud, as will now be discussed, the stud would likewise be integrally formed of the same material.

As briefly noted above, and with respect to FIGS. 6-7, the construction element 100 may be a self-clinching stud. In such a configuration, the construction element 100 comprises the body portion 102 and the punch portion 104. A shank 138 extends outwards from the second end surface 104*a* of the construction element 100 along the central axis 'X.' Notably, no bore (e.g., bore 106 shown in FIG. 3) is formed through the construction element 100. In other examples, the shank 138 may extend outwards from the first end surface 102*a* of the construction element 100 along the central axis 'X.' As shown, a thread 140 is provided about at least a portion of the shank 138.

As further shown in FIG. 6, the outer peripheral surface 122 of the body portion 102 is polygon-shaped and includes a plurality of planar-shaped faces, all having the same general dimensions (e.g., height and width). This configuration promotes sufficient engagement between the body portion 102 and a machine or hand tool. The pilot embossment 110 is likewise shown as having a polygon-shape (e.g., octagon-shaped). The pilot embossment 110 having an octagon shape can increase torque performance with respect to the engagement between the construction element 100 and the metal substrate, after installation because the planar-shaped faces will resist rotation when embedded into the metal substrate. Notably, the shape of the pilot embossment 110 coincides with the shape of the outer peripheral surface 122 of the body portion 102. However, in alternative embodiments, the shape of the pilot embossment 110 may be different than the shape of the outer peripheral surface 122 of the body portion 102.

Figure 7:
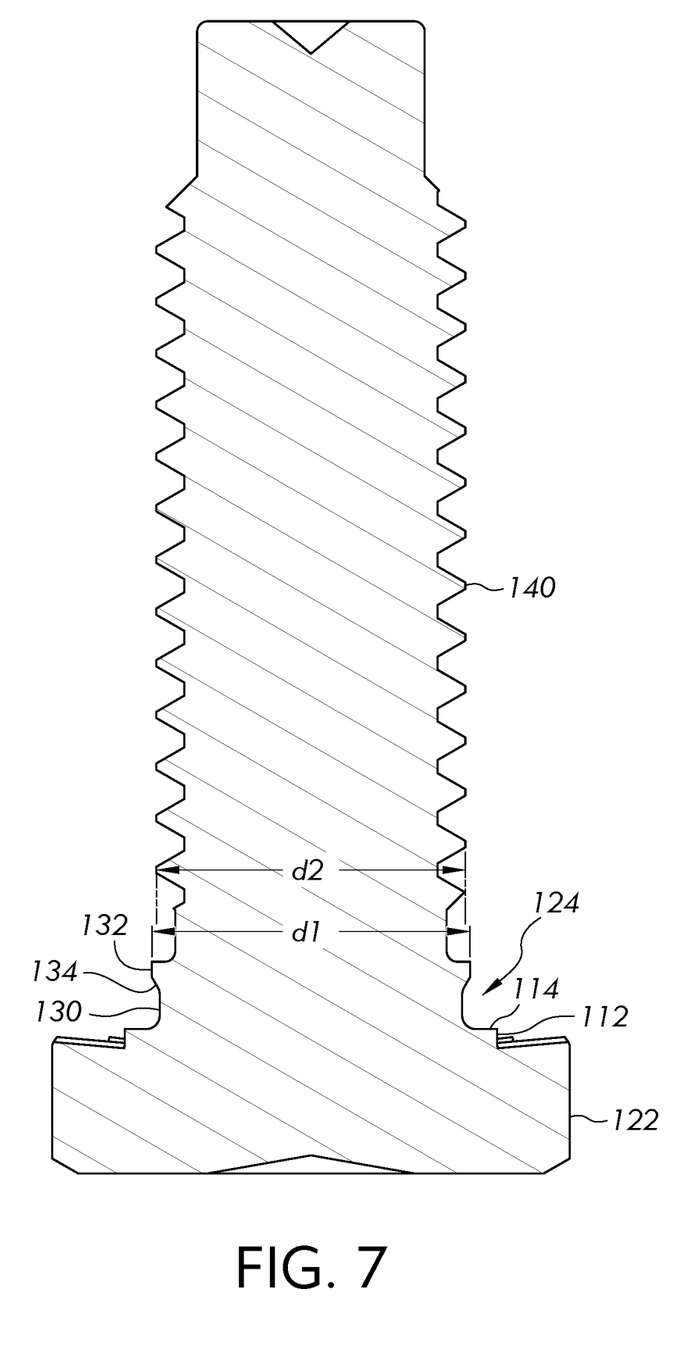
FIG. 7 is a cross-sectional view of the stud, shown in FIG. 6.

With reference to FIG. 7 (depicting the construction element 100 of FIG. 6 in cross-section), the outer peripheral surface 124 of the punch portion 104 again includes the first and second perimeter surfaces 130, 132, and the intermediate surface 134 disposed therebetween. Notably, an outer diameter 'd1' of the punch portion 104 (i.e., an outer diameter of the second perimeter surface 132) is greater than an outer diameter 'd2' of the thread 140. This dimensional difference promotes alignment of the fastener 100 with respect to the metal substrate during installation (i.e., as the shank 138 is received within a pre-made hole formed in the metal substrate), and increases bending moment performance.

Reference will now be made with respect to installation of the construction element 100 to a metal substrate. While the below disclosure focuses on installing a construction element 100 being a self-clinching spacer (as depicting in FIGS. 1-5) to the metal substrate, it is to be understood that the same or similar installation steps likewise apply to other self-clinching construction elements, (e.g., self-clinching nuts, self-clinching studs as depicted in FIGS. 6-7, etc.).

As briefly mentioned above, when attaching a traditional self-clinching construction element to a conventional metal substrate (e.g., a flat, relatively thin metal panel), the construction element is placed on one side of the metal substrate, while an anchoring block is placed on an opposite side of said metal substrate and aligned with the construction element. A drive mechanism (i.e. a press) would then force the construction element into the metal substrate in a direction towards the anchoring block. That is, the construction element and the metal substrate would essentially be sandwiched between the drive mechanism and the anchoring block such that the metal substrate would plastically deform and conform to various geometries of the construction element.

Such a conventional installation technique is not possible with relatively thicker metal substrates or more complex metal substrates, such as hollow-metal tubes. In particular, sandwiching a hollow-metal tube and a corresponding construction element between a drive mechanism and an anchoring block would either completely deform the hollow-metal tube or yield unacceptable push-out results (i.e., push-out being an amount of force required to separate the construction element from the metal substrate). In the latter scenario, such conventional construction elements would not permit enough deformed material to flow in order for the metal substrate to fully conform to the specific geometries of the construction element associated with clinching the construction element thereto.

The construction element 100 (e.g., the self-clinching spacer) described above has been designed to promote attachment to metal substrates having difficult geometries (e.g., hollow-metal tubes) without the shortcomings of the prior installation techniques. For example, the construction element 100 is disposed adjacent the hollow-metal tube such that the punch portion 104 is coaxial with the pre-made hole formed in the tube. Next, the construction element 100 is axially translated such that the punch portion 104 is received within the pre-made hole and such that a distal-end of the tube engages the pilot embossment 110. Notably, due to the dimensional differences between the pilot embossment 110 and the lugs 116, as the distal-end of the tube engages (i.e., physically contacts) the pilot embossment 110, the distal-end of the tube does not engage with any of the lugs 116 at this stage of the installation.

Thereafter, a drive mechanism (i.e., a press) forces the construction element 100 towards the hollow-metal tube (e.g., a drive head physically contacts the first end surface 102*a* of the construction element 100 and drives the construction element 100 axially into the circumferential wall of the tube). Due to the applied force, the portion of the tube engaging the pilot embossment 110 plastically deforms and flows into the annularly-shaped recessed pocket 136 defined in the punch portion 104. In other words, the applied force from the drive mechanism is transferred via the pilot embossment 110 into the tube (or substrate). As the construction element 100 continues to be driven into the tube in the axial direction, the distal-end of the tube then engages with the respective contact faces 120 of the lugs 116. Again, due to the applied force, the portion of the tube engaging the lugs 116 plastically deforms and flows to conform to the geometric shapes of the lugs 116. For example, the material of the tube can flow and engage with (i.e., physically contact) the annular-shaped surface 108 of the body portion 102.

Accordingly, in a fully installed position, material of the tube is captured within the recessed pocket 136 between the second end surface 104*a* of the construction element 100 and the engagement surface 114 of the pilot embossment 110, and also conforms to the general shapes of the lugs 116.

Thus, the construction element 100 is both clinched in place against axial movement and rotational movement. More specifically, the material being received within the recessed pocket 136 promotes sufficient push-out results such that the construction element 100 is not easily separated from the metal substrate (i.e., the hollow metal tube) and the material conforming to the general shape of the lugs 116 increase torque performance (i.e., hinders rotation of the construction element 100 with respect to the metal substrate, after installation).

It is to be appreciated, however, that the construction element 100 can likewise be applied to conventional planar metal substrates having varying thicknesses and materials. In such an installation, the pilot embossment 110 will similarly operate to plastically deform the planar metal substrate so that it flows into the annularly-shaped recessed pocket 136 defined in the punch portion 104 for securing the construction element 100. For example, where the construction element 100 is a self-piercing and self-clinching spacer configured to be attached to a conventional, planar metal substrate, the construction element 100 is placed on one side of the metal substrate, while an anchoring block is placed on an opposite side of said metal substrate and aligned with the construction element 100. A drive mechanism (i.e., a press) then forces the construction element 100 into the metal substrate in a direction towards the anchoring block. Notably, because the construction element 100 in this example is a self-piercing and self-clinching spacer, no pre-made aperture is formed in the metal substrate. Rather, as the construction element 100 is forced into engagement with the metal substrate, the second end surface 104a of the construction element 100 pierces the metal substrate and creates space (i.e., an aperture, through-hole, etc.) to accommodate the punch portion 104 of the construction element 100. In particular, relative movement between the construction element 100 and the metal substrate causes a peripheral edge of the second end surface 104a of the construction element 100 to shear into (and through) the metal substrate.

As the construction element 100 is driven into the metal substrate, material of the metal substrate engages with the pilot embossment 110, which plastically deforms said material such that it flows into the annularly-shaped recessed pocket 136 defined in the punch portion 104. Subsequently, material of the metal substrate engages with the respective contact faces 120 of the lugs 116. Again, due to the applied force (via the press), said material plastically deforms and flows to conform to the geometric shapes of the lugs 116. For example, the material of the metal substrate can flow and engage with (i.e., physically contact) the annular-shaped surface 108 of the body portion 102 and/or the pair of side-walls 118 of each respective lug 116.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A self-clinching construction element for attachment to a plastically deformable metal substrate, the self-clinching construction element comprising:
   a body portion with a central axis, the body portion including an outer peripheral surface extending in a direction of the central axis, and an annular-shaped surface extending in a direction perpendicular to the central axis;
   a punch portion being coaxial with the central axis and extending from the body portion, the punch portion including an outer peripheral surface extending in the direction of the central axis;
   a pilot embossment being coaxial with the central axis and extending from the body portion such that the pilot embossment is concentrically disposed between the annular-shaped surface and the punch portion, wherein the pilot embossment is configured to engage and plastically deform said metal substrate such that the metal substrate flows into a recessed pocket defined in the outer peripheral surface of the punch portion; and
   a plurality of spaced apart lugs collectively encircling the punch portion.

2. The self-clinching construction element of claim 1, wherein one of the lugs includes a contact face configured to engage said metal substrate, and wherein the contact face is concave shaped.

3. The self-clinching construction element of claim 1, wherein the pilot embossment comprises a perimetric surface and an engagement surface, wherein the perimetric surface extends in the direction of the central axis, and wherein the engagement surface is annular in shape and extends in the direction perpendicular to the central axis.

4. The self-clinching construction element of claim 3, wherein the perimetric surface lies on a first imaginary circumferential plane that is parallel to the central axis, and wherein the engagement surface is perpendicular to the perimetric surface.

5. The self-clinching construction element of claim 3, wherein the annular-shaped surface lies on an imaginary horizontal plane, wherein the pilot embossment projects axially from the imaginary horizontal plane by a first distance and the lugs project axially from the imaginary horizontal plane by a second distance, and wherein the first distance is greater than the second distance.

6. The self-clinching construction element of claim 3, wherein one of the lugs comprises a contact face extending between a pair of upstanding side-walls, wherein the contact face includes opposite, first and second end portions, the first end portion being formed with the perimetric surface of the pilot embossment, and the second end portion extending to the outer peripheral surface of the body portion.

7. The self-clinching construction element of claim 1, wherein the outer peripheral surface of the punch portion comprises first and second perimeter surfaces, and an intermediate surface disposed therebetween, and wherein the intermediate surface is angled with respect to the central axis.

8. The self-clinching construction element of claim 7, wherein the first and second perimeter surfaces lie on first and second imaginary circumferential planes, respectively, wherein the second imaginary circumferential plane is radially offset from the first imaginary circumferential plane, and wherein said radial offset defines the recessed pocket.

9. The self-clinching construction element of claim 7, wherein the first perimeter surface extends axially from the pilot embossment to the intermediate surface, and wherein the second perimeter surface extends axially from the intermediate surface to an end surface of the self-clinching construction element.

10. The self-clinching construction element of claim 9, wherein the intermediate surface gradually and continuously inclines from the first perimeter surface to the second perimeter surface in the direction perpendicular to the central axis.

11. The self-clinching construction element of claim 7, wherein the first and second perimeter surfaces and the intermediate surface are all planar, in cross-section.

12. The self-clinching construction element of claim 1, further comprising a bore extending through both the body portion and the punch portion in the direction of the central axis such that the bore extends from a first end surface of the self-clinching construction element to a second end surface of the self-clinching construction element.

13. The self-clinching construction element of claim 12, wherein the bore is threaded along the central axis.

14. The self-clinching construction element of claim 1, further comprising a shank extending outwards from an end surface of the construction element, wherein the shank is coaxial with and is threaded along the central axis.

15. The self-clinching construction element of claim 1, wherein the pilot embossment continuously extends about the punch portion in an uninterrupted manner.

16. The self-clinching construction element of claim 1, wherein the pilot embossment has a polygonal shape.

17. The self-clinching construction element of claim 1, wherein the pilot embossment has a cylindrical shape.

18. A self-clinching construction element for attachment to a plastically deformable metal substrate, the self-clinching construction element comprising:
a body portion with a central axis, the body portion including an outer peripheral surface extending in a direction of the central axis, and an annular-shaped surface extending in a direction perpendicular to the central axis;
a punch portion being coaxial with the central axis and extending from the body portion, the punch portion including an outer peripheral surface extending in the direction of the central axis;
a pilot embossment being coaxial with the central axis and extending from the body portion such that the pilot embossment is concentrically disposed between the annular-shaped surface and the punch portion; and
a lug axially projecting outwards from the annular-shaped surface and extending radially outwards from the pilot embossment,
wherein during installation of the self-clinching construction element to the metal substrate, the pilot embossment and the lug are dimensionally configured such that the metal substrate engages with the pilot embossment prior to engaging the lug, and
wherein the pilot embossment is configured such that as the metal substrate engages the pilot embossment, the metal substrate plastically deforms and flows radially inwards into a recessed pocket defined in the outer peripheral surface of the punch portion.

19. The self-clinching construction element of claim 18, wherein the annular-shaped surface lies on a first imaginary horizontal plane, wherein the pilot embossment comprises an engagement surface configured to engage the metal substrate, said engagement surface lying on a second imaginary horizontal plane, and wherein the central axis is normal to both the first and second imaginary horizontal planes.

20. The self-clinching construction element of claim 19, wherein the pilot embossment further comprises a perimetric surface extending in the direction of the central axis, and wherein the perimetric surface has a greater radial distance from the central axis than the outer peripheral surface of the punch portion.

21. A self-clinching construction element for attachment to a plastically deformable metal substrate, the self-clinching construction element comprising:
a body portion with a central axis, the body portion including an outer peripheral surface extending in a direction of the central axis, and an annular-shaped surface extending in a direction perpendicular to the central axis;
a punch portion being coaxial with the central axis and extending from the body portion, the punch portion including an outer peripheral surface extending in the direction of the central axis, the punch portion comprising first and second perimeter surfaces, and an intermediate surface disposed therebetween, wherein the intermediate surface gradually and continuously inclines from the first perimeter surface to the second perimeter surface in the direction perpendicular to the central axis, and wherein the second perimeter surface is radially offset from the first perimeter surface to define a recessed pocket in the punch portion;
a pilot embossment being coaxial with the central axis and extending from the body portion such that the pilot embossment is concentrically disposed between the annular-shaped surface and the punch portion, the pilot embossment continuously extending about the punch portion in an uninterrupted manner, wherein the pilot embossment comprises a perimetric surface and an engagement surface, wherein the perimetric surface extends in the direction of the central axis, and wherein the engagement surface is annular in shape and extends in the direction perpendicular to the central axis, said engagement surface being configured to engage and plastically deform said metal substrate such that the metal substrate flows into the recessed pocket; and
a plurality of spaced apart lugs axially projecting outwards from the annular-shaped surface and extending radially outwards from the perimetric surface of the pilot embossment, the plurality of spaced apart lugs collectively encircling the pilot embossment, wherein one of the lugs has a contact face configured to engage said metal substrate, and wherein the contact face is concave shaped,
wherein during installation of the self-clinching construction element to the metal substrate, the pilot embossment and said one of the lugs are dimensionally configured such that the metal substrate engages with the engagement surface of the pilot embossment prior to engaging the contact face.

\* \* \* \* \*